US 9,507,670 B2

(12) United States Patent
Timashev et al.

(10) Patent No.: US 9,507,670 B2
(45) Date of Patent: Nov. 29, 2016

(54) SELECTIVE PROCESSING OF FILE SYSTEM OBJECTS FOR IMAGE LEVEL BACKUPS

(75) Inventors: Ratmir Timashev, Baar (CH); Anton Gostev, Saint-Petersburg (RU)

(73) Assignee: Veeam Software AG, Baar (CH)

( * ) Notice: Subject to any disclaimer, the term of this patent is extended or adjusted under 35 U.S.C. 154(b) by 325 days.

(21) Appl. No.: 13/159,229

(22) Filed: Jun. 13, 2011

(65) Prior Publication Data
US 2011/0307657 A1   Dec. 15, 2011

Related U.S. Application Data

(60) Provisional application No. 61/354,529, filed on Jun. 14, 2010.

(51) Int. Cl.
| G06F 12/00 | (2006.01) |
| G06F 13/00 | (2006.01) |
| G06F 13/28 | (2006.01) |
| G06F 11/14 | (2006.01) |

(52) U.S. Cl.
CPC .............................. *G06F 11/1451* (2013.01)

(58) Field of Classification Search
CPC .................................................. G06F 11/1451
USPC .................. 711/112, 162, E12.001, E12.103
See application file for complete search history.

(56) References Cited

U.S. PATENT DOCUMENTS

| 5,357,475 | A | * | 10/1994 | Hasbun | ................ | G11C 16/102 |
| | | | | | | 365/185.11 |
| 5,742,818 | A | * | 4/1998 | Shoroff | ............. | G06F 17/30076 |
| 5,778,395 | A | * | 7/1998 | Whiting | .............. | G06F 11/1464 |
| 5,890,169 | A | * | 3/1999 | Wong | ................ | G06F 17/30135 |
| 5,907,672 | A | * | 5/1999 | Matze | ................. | G06F 11/1451 |
| | | | | | | 711/162 |
| 6,189,081 | B1 | * | 2/2001 | Fujio | ..................... | G06F 3/0616 |
| | | | | | | 711/170 |
| 6,453,383 | B1 | * | 9/2002 | Stoddard | ............... | G06F 3/0607 |
| | | | | | | 707/999.202 |
| 6,665,779 | B1 | * | 12/2003 | Polfer | ................ | G06F 11/1451 |
| | | | | | | 711/112 |

(Continued)

OTHER PUBLICATIONS

Notification of Transmittal of the International Search Report and the Written Opinion of the International Searching Authority, or the Declaration and Written Opinion of the International Searching Authority, International Application No. PCT/US2011/040358, issued Jan. 19, 2012.

*Primary Examiner* — Sheng-Jen Tsai
(74) *Attorney, Agent, or Firm* — Sterne, Kessler, Goldstein & Fox P.L.L.C.

(57) ABSTRACT

Systems, methods, and computer program products are provided for reducing the size of image level backups. An example method receives backup parameters identifying a physical or Virtual Machine (VM) to backup and at least one file system object to include in the backup. The method connects to production storage corresponding to the selected physical or virtual machine and obtains access to data stored in disk corresponding to the selected file system object(s). The method fetches file allocation table (FAT) blocks from the disk and parses contents of the FAT blocks to determine if the disk blocks correspond to the selected file system object(s). The method creates a backup disk image FAT comprising blocks corresponding to the selected file system object(s). The method creates a reconstructed disk image FAT blocks corresponding to the backup FAT and disk image data blocks belonging to the selected file system object(s) and all other disk image data blocks are saved as zero blocks. A reconstructed disc image is compressed and stored in a backup file on backup storage, or replicated (copied) to another storage intact.

23 Claims, 4 Drawing Sheets

(56) References Cited

U.S. PATENT DOCUMENTS

| | | | |
|---|---|---|---|
| 6,742,147 B1* | 5/2004 | Sasaki | G11B 20/18 369/30.07 |
| 6,931,558 B1 | 8/2005 | Jeffe et al. | |
| 7,093,086 B1 | 8/2006 | Van Rietschote | |
| 7,191,299 B1 | 3/2007 | Kekre et al. | |
| 7,254,682 B1* | 8/2007 | Arbon | G06F 11/1435 711/161 |
| 7,831,789 B1* | 11/2010 | Per | G06F 11/1451 707/625 |
| 8,156,165 B2* | 4/2012 | Malueg | G11C 11/16 707/822 |
| 8,200,637 B1* | 6/2012 | Stringham | G06F 11/1451 707/670 |
| 8,682,862 B2* | 3/2014 | Rosikiewicz | G06F 17/30067 707/679 |
| 2001/0051954 A1* | 12/2001 | Yamashita | G06F 17/30067 |
| 2002/0051260 A1* | 5/2002 | Kurakata | H04N 1/2112 358/524 |
| 2003/0031095 A1* | 2/2003 | Jeon | G06F 3/0626 369/1 |
| 2003/0142960 A1* | 7/2003 | Yokota | G10H 1/0041 386/260 |
| 2003/0185111 A1* | 10/2003 | Ohbi | G11B 20/00086 369/30.09 |
| 2004/0153689 A1* | 8/2004 | Assaf | G06F 11/0727 714/1 |
| 2005/0165853 A1* | 7/2005 | Turpin | G06F 3/0608 |
| 2005/0177777 A1* | 8/2005 | Seaburg | G06F 11/1464 714/42 |
| 2005/0259542 A1* | 11/2005 | Mochizuki | G06F 3/0613 369/53.2 |
| 2006/0029230 A1* | 2/2006 | Kihara | G06F 17/30067 380/269 |
| 2007/0186070 A1* | 8/2007 | Federa | G06F 12/1425 711/163 |
| 2007/0261056 A1* | 11/2007 | Iizuka | G06F 8/61 718/100 |
| 2007/0294320 A1* | 12/2007 | Yueh et al. | 707/204 |
| 2008/0028004 A1* | 1/2008 | Lee | G06F 11/1435 |
| 2008/0069522 A1* | 3/2008 | Okada | G06F 11/1435 386/247 |
| 2008/0228841 A1* | 9/2008 | Mizuno | G06F 11/2097 |
| 2008/0275924 A1 | 11/2008 | Fries | |
| 2009/0055452 A1* | 2/2009 | Tang | G06F 17/30191 |
| 2009/0094603 A1 | 4/2009 | Hiltgen et al. | |
| 2009/0106484 A1* | 4/2009 | Yeh | G06F 12/0246 711/103 |
| 2009/0123124 A1* | 5/2009 | Ham | G11B 27/034 386/278 |
| 2009/0164529 A1* | 6/2009 | McCain | G06F 11/1464 |
| 2009/0216970 A1 | 8/2009 | Basler et al. | |
| 2009/0222496 A1 | 9/2009 | Liu et al. | |
| 2009/0313447 A1 | 12/2009 | Nguyen et al. | |
| 2010/0070725 A1* | 3/2010 | Prahlad | G06F 11/1453 711/162 |
| 2010/0076932 A1* | 3/2010 | Lad | G06F 17/30088 707/639 |
| 2010/0107158 A1 | 4/2010 | Chen et al. | |
| 2010/0132022 A1 | 5/2010 | Venkatasubramanian | |
| 2010/0138406 A1* | 6/2010 | Seo | G06F 3/0611 707/713 |
| 2010/0332534 A1* | 12/2010 | Chang | G06F 17/30091 707/770 |
| 2011/0016089 A1* | 1/2011 | Freedman | G06F 11/1451 707/640 |
| 2012/0060006 A1* | 3/2012 | Paterson-Jones | G06F 17/30067 711/162 |
| 2014/0250093 A1* | 9/2014 | Prahlad | G06F 11/1453 707/696 |

* cited by examiner

SELECTIVE PROCESSING OF FILE SYSTEM OBJECTS FOR IMAGE LEVEL BACKUPS

CROSS-REFERENCE TO RELATED APPLICATIONS

The present application claims the benefit of U.S. Provisional Patent Application No. 61/354,529, filed on Jun. 14, 2010, entitled "Selective Processing of File System Objects for Image Level. Backups," which is incorporated by reference herein in its entirety,

FIELD OF THE INVENTION

The present invention is related to methods for backing up physical and virtual machine data into image level backups and replicas. In particular, the present invention relates to methods, systems, and computer program products for reducing the amount of data that needs to be backed up or replicated at the image level by limiting processing to disk image blocks belonging to file system objects that represent value to applications and users.

BACKGROUND OF THE INVENTION

Image level backups used for disaster recovery present new challenges as compared to legacy file system level backups. In particular, the size of disk images that need to be backed up require much longer times to backup. Backups of large disk images also significantly increase backup file storage requirements.

As compared to file level backups, which are typically set to backup only required file system objects, image level backups save complete images of backed up disks. Thus, unlike file-level backups, conventional image level backups typically include unnecessary data blocks belonging to file system objects that are of no value to users, deleted file system objects, file system objects marked for deletion, unallocated space, and unused space. While currently available commercial backup solutions such as VEEAM™ Backup and Replication from Veeam Software International Ltd. are able to efficiently remove white spaces (e.g., by using compression and deduplication), other unneeded data blocks mentioned above are still processed as part of image-level backups. This slows down backup performance and requires additional backup storage space. Thus, there is a need for methods of excluding unnecessary data from image level backups.

Conventional methods for reducing the amount of data which needs to be retrieved from a source disk and stored in the backup include querying a specific part of file system's FAT (File Allocation Table) to identify disk blocks which contain deleted data. The identified data blocks are then skipped during backup activities. For example, in systems using the MICROSOFT™ Windows New Technology File System (NTFS), deleted data blocks can be identified by querying and parsing a Master File Table (MFT), which is a part of the NTFS FAT. Some currently available disaster recovery tools, such as vRanger and vReplicator from QUEST SOFTWARE™, implement this technique.

Conventional methods for optimizing image level backups have significant drawbacks. Some of these shortcomings are discussed below.

First, conventional backup optimization techniques do not provide significant benefits unless a disk being backed up has a significant amount of blocks with deleted data (i.e., blocks marked as contained deleted data). However, many disks, such as disks used by newly-provisioned servers and computers with newly-installed applications and file system objects, do not have significant amounts of blocks with deleted data. In fact, using conventional techniques, additional processing is required to determine which disk blocks have deleted data. This additional processing may result in slow backup times.

Second, conventional backup optimization techniques provide little or no benefit during "incremental" backups, and may only be effective for "full" backups. Currently available technologies that facilitate efficient incremental backup, such as VMware Changed Block Tracking (CBT), allow backup solutions to determine data blocks in which content has changed since a previous backup, so that only those blocks are backed up during the incremental backup cycle. However, deleting data in file systems like NTFS, does not actually change the blocks corresponding to deleted file system objects, so the data blocks are not changed. Thus, these unchanged data blocks will not be picked up by the CBT for inclusion in an incremental backup without requiring some special processing. For example, 'deleted' NTFS file system objects like directories and files are merely marked for deletion in the MFT until the storage space is needed, at which point the corresponding blocks are filled with the new content.

Third, conventional backup techniques provide little benefit for incremental backups due to the nature of modern server workloads, which result in relatively little data being deleted, and primarily result in new data being added. This results in deleted data blocks being almost instantly reused by new data, leading to relatively few performance or storage benefits for incremental backups.

Fourth, conventional backup methods are not effective at optimizing backups of file systems which natively wipe deleted blocks (i.e., zero out) upon file system object deletion, such as the Linux third and fourth extended file systems (ext3 and ext4).

Finally, and perhaps most importantly, conventional image level backup techniques process and store significant amounts of data that are unnecessary in backup files. For example, conventional methods process and store the disk image data blocks corresponding to the contents of swap files, hibernation files, the contents of temporary ('temp') folders, recycling bin folders; and/or data such as Windows operating system (OS) system files which either do not need to be backed up at all, or can be easily restored from multiple other readily available sources. For example, certain OS file system objects, such as directories and files for a server or compute' can be readily restored from other similar servers or computers with the same OS installed. Conventional image-level backup optimization methods fail to take this into account and as a result consume valuable time and storage space processing data blocks that correspond to contents of files of no value to users.

Therefore, there is a need for an efficient techniques for optimizing image level backups which address the shortcomings of the image level backup optimization techniques described above.

SUMMARY OF THE INVENTION

Accordingly, what is needed are tools which enable backup operators and administrators to selectively reduce the amount of data that needs to be read from a source disk and stored in a corresponding image level backup. What is further needed are systems, methods, and computer program products for selective processing of objects (i.e., object-selective processing) within image level backups.

Embodiments of the present invention include methods, systems, and computer program products for efficient processing of image level backups. As would be understood by one skilled in the relevant art(s), the methods described herein with reference to image level backups can also be applied to other image level disaster recovery techniques, such as creating replicas via replication and simple copying of images.

According to an exemplary embodiment, a system for selective processing of file system objects for an image level backup is disclosed. The system comprises a backup engine which includes a receiving module, a connection module, a file allocation table processing module, and a block processing module. The receiving module is configured to receive backup parameters for the image level backup, wherein the backup parameters include a selection of a machine to backup, and a selection of at least one file system object to include in the image level backup. The connection module is configured to connect to production storage corresponding to the selected machine, wherein the connection module is further configured to obtain data from a source disk corresponding to the selected at least one file system object, and wherein the source disk is in the production storage. The file allocation table (FAT) processing module configured to fetch FAT blocks from the source disk, search the fetched FAT blocks to determine selected set of data blocks of the source disk, wherein the selected set of data blocks correspond to the selected at least one file system object, and create a backup FAT from the fetched FAT blocks, wherein the backup FAT comprises only records corresponding to the selected at least one file system object. The block processing module configured to read the determined selected set of data blocks, and save the backup FAT and the determined selected set of data blocks to a reconstructed disk image.

Embodiments of the invention achieve at least five key improvements over conventional image level backup optimization techniques.

First, in contrast to traditional solutions, embodiments of the present invention do not rely on determining and skipping processing of deleted data blocks. This improvement enables reduction of the amount of data to be backed up during image level backup even in cases when there are no blocks containing deleted data on the disk being backed up.

Secondly, embodiments of the invention achieve significant improvements in processing speed and reduction in the size of backups. Embodiments of the invention achieve backup performance improvements not just for full backups, but also for incremental and differential image block level backups that backup file system objects that have been changed or added since the last backup.

Thirdly, embodiments of the present invention also enable improvements for file systems that natively wipe (zero out) data blocks belonging to deleted file system objects, such as, but not limited to the Linux ext3 and ext4 file systems.

Fourthly, embodiments of the invention enable filtering out unimportant data blocks from processing and storing as a part of image level backups, such as data blocks occupied by swap files. This is because in accordance with embodiments of the invention, swap files, temporary ('temp') files, and other data blocks that are not important to users and applications are not backed up, even in cases when full backups are being processed. For example, embodiments of the present invention filter out paging and virtual memory files used by Windows server and workstation operating systems (OSs) and only backup data blocks used for applications and corresponding to application executables.

Finally, in contrast to traditional backup techniques that only optimize full backups, embodiments of the invention also optimize incremental and differential backups. This is important because embodiments of the present invention are compatible with commercially available disaster recovery tools, such as VEEAM™ Backup and Replication from Veeam Software International Ltd., that only require that a full backup be performed once, with subsequent backups being forever-incremental with only changed and new blocks being processed.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art to make and use the invention.

Figure 1:
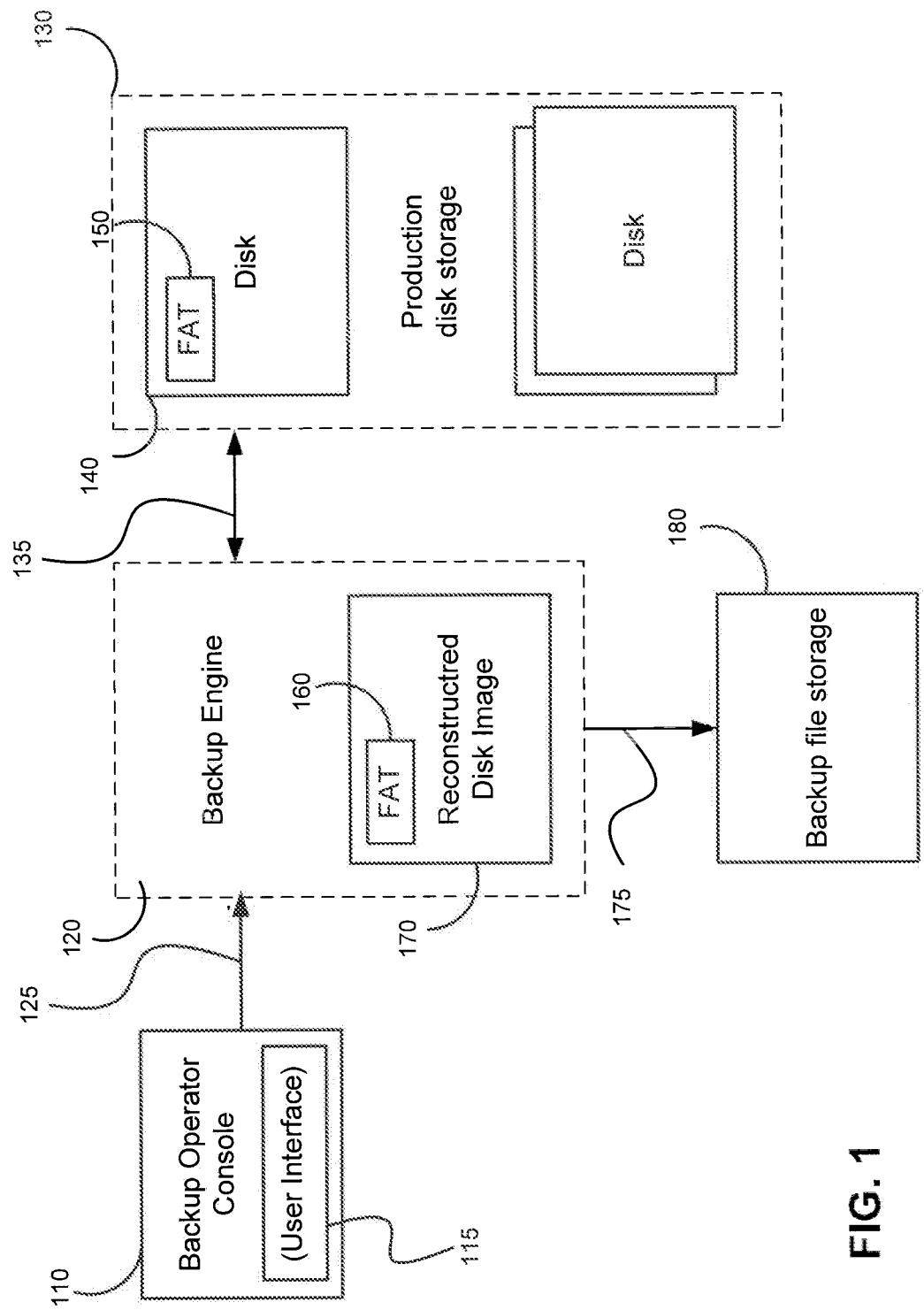
FIG. 1 illustrates a system architecture for object-selective backup processing, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, non-transitory computer readable media having instructions stored thereon, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Unless specifically stated differently, a user, a backup operator, and an administrator are interchangeably used herein to identify a human user, a software agent, or a group of users and/or software agents. Besides a human user who may perform object-selective backups, a software application or agent may sometimes process image level backupss. Accordingly, unless specifically stated, the terms "backup operator," "administrator," and "user" as used herein are not limited to a human being.

As used herein, in an embodiment, the term "server" encompasses computing devices that are designed to function as one or more of file servers, email servers, Domain Name System (DNS) servers, Domain Controller (DC) servers, application servers, database servers, web servers, firewall servers, other enterprise servers, and back end servers. A server may comprise of one or more server machines. A server may be implemented as collection of servers such as a server farm or server cluster. For example, web servers may be commercially available server machines with one or more central processing units (CPUs). Alternatively, these web servers may comprise multiple computing devices and/or computing functionality hosted on multiple server machines (i.e., a server farm).

The present invention relates to systems, methods, and computer program products for object-selective processing of image level backups.

Object-Selective Backup System Architecture

FIG. 1 depicts system architecture 100 for processing object-selective image level backups, in accordance with an embodiment of the invention. An operator console 110 includes a user interface (UI) 115 for backup operators and administrators. In an embodiment, the UI 115 may be displayed on computer display 430 shown in FIG. 4. UI 115 can be used to add and select individual file system objects to be included in, or excluded from an image level backup. As used herein, an image level backup is a backup of the disk images of a physical or virtual machine (VM) corresponding to a server or computer. Because any physical machine can be backed up on image level (for example, by leveraging an agent), the invention applies to both image level backup of both virtual and physical machines.

As used herein, a "virtual machine" (VM) is a software implementation of a machine such as a server, computer, or other computing device that supports the execution of a complete operating system (OS) and executes application programs like a physical machine. A VM duplicates the functionality of a physical machine implemented in hardware and software. Software applications and the OS running on a VM are limited to the resources and abstractions provided by the VM. In an embodiment, virtual machines (VMs) are viewable within an overall virtual infrastructure. According to an embodiment of the invention, the backup file system objects selected to be backed up can be located in production storage 130, which includes one or more disks 140 which form parts of a production disk storage. As described in detail below, embodiments of the invention read data 135 to be backed up by either attaching an image of disk 140 to a backup engine 120 (in case of virtual machine), or by leveraging an agent inside each processed machine to get data from disk 140 (in case of physical or virtual machine). Herein, the phrase "source disk" is used to refer to storage in production storage 130 to be backed up, such as disk 140, which may be a disk of a physical machine or a disk image of a virtual machine.

UI 115 can also be used to remove a previously selected file system object from an image level backup to be processed. Operator console 110 can also be used to enter and configure other backup parameters 125 for an image level backup. For example, in the exemplary embodiment depicted in FIG. 3, UI 115 can be used to disable object-selective image level processing for a backup, to process all but a selected subset of file system objects in a backup, or to include (copy) only selected file system objects in an image level backup.

Figure 3:
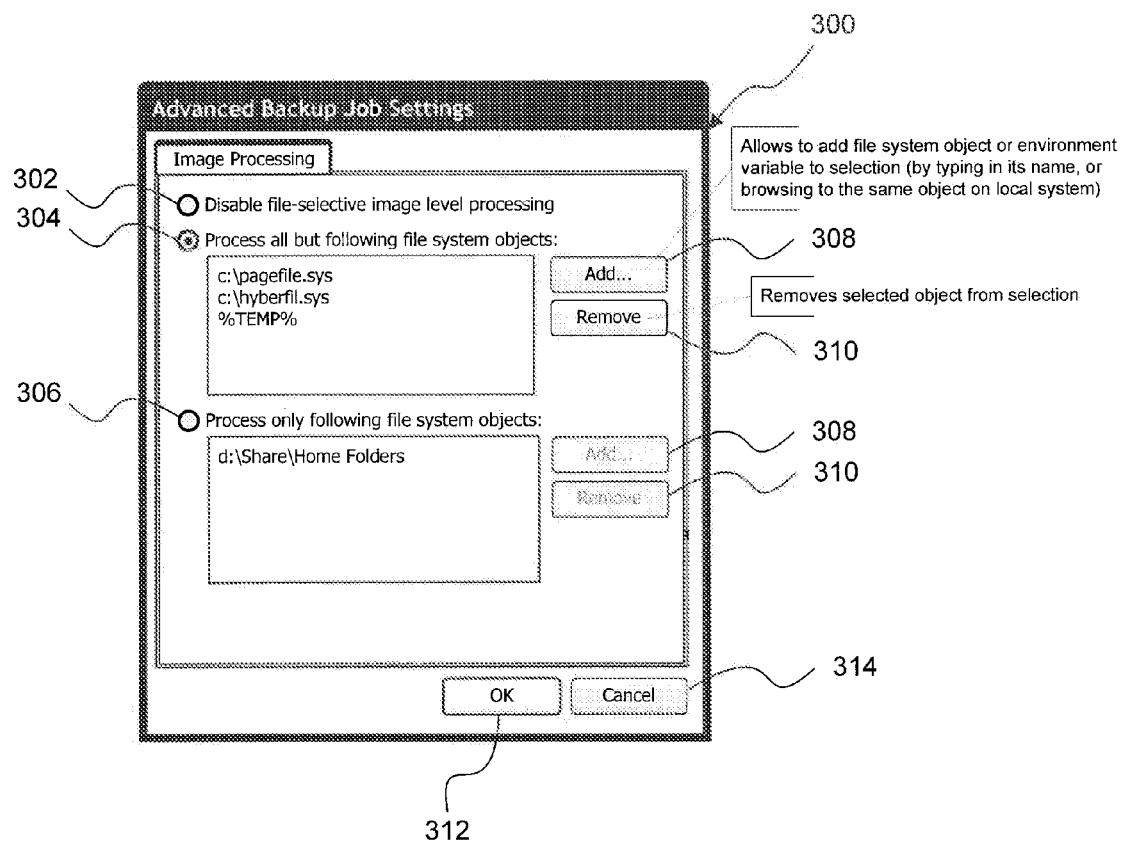
FIG. 3 illustrates an exemplary graphical user interface (GUI), wherein objects can be selected for image level backup processing, in accordance with an embodiment of the invention.

In the exemplary embodiments illustrated in FIGS. 1 and 3, operator console 110 includes a backup object selection interface 300 for selecting machine's file system objects to backup for an image level backup of a machine. Selections of file system objects to include and exclude are received by backup engine 120 as backup parameters 125. According to an embodiment, the file system objects to be included may be programmatically determined based upon the file system objects selected to be excluded. After acquiring backup parameters 125, backup engine 120 connects to production storage 130 and initiates block level access to read data 135 from the corresponding disk 140.

In accordance with an embodiment of the invention, backup engine 120 is an application comprising modules configured to process an object-selective image level backup. In the exemplary embodiment depicted in FIG. 1, backup engine 120 is configured to receive backup parameters 125 from backup operator console 110. In an embodiment, the received backup parameters 125 are acquired by a receiving module (not shown). Backup engine 120 comprises a module configured to read data 135 from production storage 130 in order retrieve and parse file allocation table (FAT) 150 of disk 140, which in turn comprises part of production disk storage. In one embodiment, FAT 150 data can be retrieved directly from storage, by reading the disk data blocks corresponding to FAT data location. In another embodiment, the FAT data can be retrieved by an agent (not shown) installed in the processed virtual machine or physical computer. Backup engine 120 farther comprises a module configured to create a reconstructed disk image 170 comprising a modified backup FAT 160. Backup engine 120 also includes a module configured to write an image level backup 175 to backup file storage 180 corresponding to reconstructed disk image 170. Additional functionalities and features of backup engine 120 are discussed below with continued reference to FIG. 1.

As illustrated in FIG. 1, production storage 130 can comprise one or more disks (or disk images—in case of virtual machines) 140 corresponding to each disk used by production machine disk storage corresponding to a machine being backed up. Operator console can be used to select file system objects such as, but not limited to, directories, applications, data files, log files, and other file system objects associated with a machine's applications.

As used herein, "disk image" refers to logical storage that has been abstracted and separated from physical storage, such as network-attached storage (NAS), file servers, disks, and other physical storage devices. In an embodiment, a disk image is implemented via virtual storage logic and is viewable within a virtual infrastructure as a storage device containing one or more virtual disks, which are separated from physical storage disks.

In an embodiment, backup engine 120 is an application that functions as a backup agent. According to an embodiment, backup engine 120 is configured to retrieve disk blocks that store file systems' file allocation table (FAT) 150. As used herein, FAT refers to a file allocation table used in a variety of file system architectures for various Operating Systems (OSs) and is not limited to a FAT file system used in MICROSOFT™ Windows. According to an embodiment of the invention, the contents of FAT 150 are parsed to determine the location (on the disk 140) of blocks of file system objects selected for inclusion in the image level backup, as specified by a backup operator using operator console 110. In this way, only the blocks of disk 140 corresponding to selected file system objects need to be read from disk or disk image 140.

In accordance with an embodiment of the invention, a copy of the contents of FAT 150 is made as backup FAT 160, which is optionally modified. The optional modification may include removing references to file system objects that have been excluded from backup per selections made in operator console 110. In another implementation, FAT 160 remains as an unmodified copy of FAT 150. In this case, certain unimportant files, such as temporary files, virtual memory files (i.e., pagefile.sys and other paging files) and hibernation files (i.e., hyberfil.sys), will still be represented in the file system of restored backup 175, but will have empty content (zeroed out data blocks). Unlike conventional techniques, embodiments of the present invention do not look up or process deleted data information.

Backup engine 120 is configured to effectively reconstruct a modified, reconstructed disk image 170 on the fly, while simultaneously compressing and saving backup data 175 to backup file storage 180. In an alternative embodiment, backup engine 120 replicates the reconstructed disk image 170 to a replica VM (not shown). For example, reconstructed disk image 170 can be replicated to remote file storage. Backup engine 120 can also copy reconstructed disk image 170 to another local or remote storage device. For example, in cases where backup 175 will be used to perform a restoration onto a replica of a VM, such as a standby VM or failover VM, reconstructed disk image 170 is replicated to the backup storage accessible from a hypervisor host running a replica VM.

According to an embodiment, reconstructed disk image 170 is created by using modified data blocks corresponding to backup FAT 160, and then retrieving and applying only those image blocks of disk 140 that correspond to the file system objects selected for backup in UI 115. Instead of including all sequential blocks of disk image 140, reconstructed disk image 170 skips blocks corresponding to file system objects that were selected for exclusion based on settings provided in UI 115 of operator console 110. According to an embodiment, exclusions can be pre-configured. For example, it may be pre-configured that files such as paging and virtual memory files (e.g., swap files), are always excluded from the backup.

In accordance with an embodiment, as reconstructed disk image 170 is being created using backup FAT 160, it is simultaneously compressed and stored in backup file storage 180 as a backup data 175. In an embodiment, disk image data blocks containing data that is to be excluded from processing is substituted by zeroed data blocks in reconstructed disk image 170. Thus, zeroed data blocks are written to reconstructed disk image 170 instead of actual data blocks belonging to objects selected for exclusion in UI 115. In this way, the storage space needed in backup file storage 180 to store reconstructed disk image 170 is reduced in cases when data is compressed and/or deduplicated before saving it to a backup file.

In an embodiment of the invention, backup data 175 can be made available to data consuming processes as a local volume so that the reconstructed disk image 170 can be later used for additional processing, verification and/or restore the backed up file system objects. In alternative embodiments, backup file storage 180 is made available to data consuming processes as remote storage via public or proprietary storage access protocols such as, but not limited to the Network File System (NFS), Common Internet File System (CIFS), and Internet Small Computer System Interface (iSCSI). Examples of additional processing include mounting reconstructed disk image 170 to a server as a volume, creating, updating or deleting some file system objects using native OS and third party tools, and committing the changes to backup data 175. Example methods for restoring file system objects and items from an image level backup are described in U.S. patent application Ser. No. 12/901,233, filed on Oct. 8, 2010 entitled "item-Level Restoration from Image Level Backups," which incorporates by reference and claims priority to U.S. Patent Provisional Application No. 61/250,586, filed on Oct. 12, 2009 entitled "Item-Level Restoration from Image Level Backup." U.S. patent application Ser. No. 12/901,233 and U.S. Patent Provisional Application No. 61/250,586 are incorporated by reference herein in their entireties. Example methods for displaying and verifying file system objects from an image level backup without fully extracting, decompressing, or decrypting the image level backup are described in U.S. patent application Ser. No. 12/901,233, which incorporates by reference and claims priority to U.S. Provisional Patent Application No. 61/302,743, filed on Feb. 9, 2010 and entitled "Systems, Methods, and Computer Program Products for Verification of Image Level Backups," which are incorporated herein by reference in their entireties. Example methods for recovering file system file system objects from an image level backup without requiring the restoration process to be executed on a computer running an operating system (OS) that supports the virtual disk file system type backed up in the image level backup are described in U.S. patent application Ser. No. 13,021,312 filed on Feb. 4, 2011 and entitled "Cross-Platform Object Level Restoration From Image Level Backups," which incorporates by reference and claims priority to U.S. Provisional Patent Application No. 61/302,877, filed on Feb. 9, 2010, and entitled "Cross-Platform Object Level Restoration From Image Level Backups." U.S. patent application Ser. No. 13,021,312 and U.S. Provisional Patent Application No. 61/302,877 are both incorporated herein by reference in their entireties.

Object-Selective Image Level Backup Methods

Figure 2:
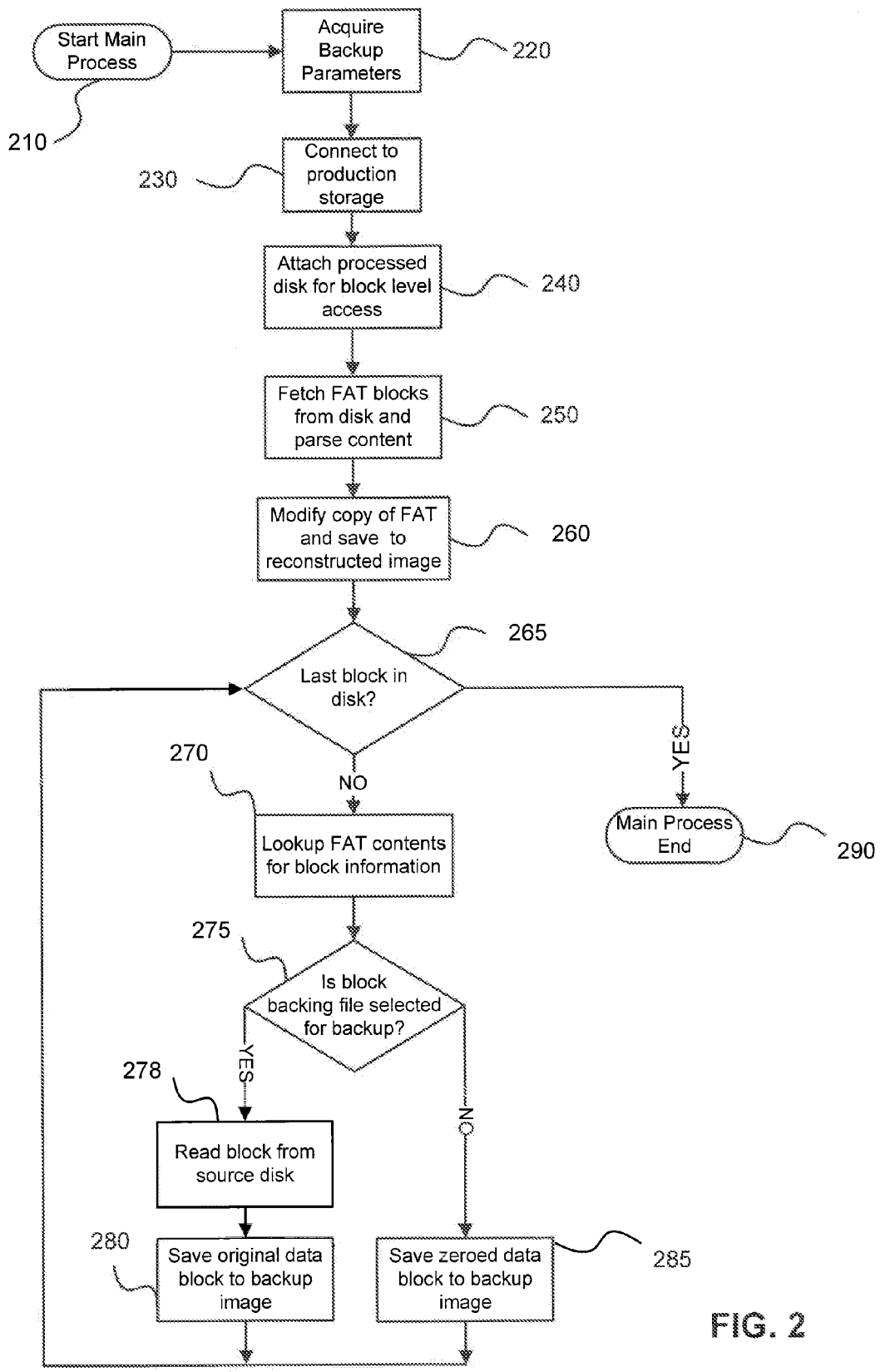
FIG. 2 is a flowchart illustrating steps by which object-selective processing of image level backups are performed, in accordance with an embodiment of the present invention.

FIG. 2 is a flowchart 200 illustrating steps by which a method is used to process object-selective image level backups, in accordance with an embodiment of the present invention.

More particularly, flowchart 200 illustrates the steps by which file system object-selective image level backups are performed using a reconstructed disk image, such as reconstructed disk image 170, according to an embodiment of the present invention. FIG. 2 is described with continued reference to the embodiment illustrated in FIG. 1. However, FIG. 2 is not limited to that embodiment. Note that the steps in the flowchart do not necessarily have to occur in the order shown.

As would be understood by one of skill in the relevant art(s), the steps of flowchart 200 described below may be accomplished via execution of computer executable instructions that, in response to execution by a computing device, perform an algorithm for creating an object-selective image level backup.

The method begins at step 210. In an embodiment, a backup application is started in step 210. For example, backup engine 120 and backup operator console 110 may be started in this step. After the backup application is started, the method proceeds to step 220.

In step 220, object-selective backup parameters 125 are received. Backup parameters 125 may include one or more of physical or virtual machines (VMs) to backup, and a list of file system objects to either include in or exclude from an image level backup. The file system objects may include directories and files, specified individually or using file name masks. In an embodiment, if a directory is selected to be included in an image level backup, all data files in the directory and subdirectories below the selected directory are automatically selected for inclusion in the image level backup. In another embodiment of the invention, if a file system object such as a directory is selected to be excluded from an image level backup, all dependent file system objects, such as files within the excluded directory and all of its subdirectories, will not be processed in the image level backup. According to an embodiment, the list of data items to be included in the backup may be programmatically determined based upon the one or more data items selected by the user to be excluded from the backup. For example, it may programmatically be determined that all files or a predetermined subset of files, except for the user selected one or more files to be excluded, are enumerated and included in the list of file system objects to be backed up. According to an embodiment, backup parameters 125 are received via user input in UI 115 within operator console 110. After receiving backup parameters 125, the method proceeds to step 230.

In step 230, backup engine 120 connects to production storage 130 used by the computer selected to be backed up in step 220. As discussed above with reference to FIG. 1, production storage 130 comprises one or more disks or (disk images) 140 of the machine to be backed up.

In step 240, backup engine 120 attaches to the required disk 140. In this step, block level read access is initialized in order to be able to retrieve process the data blocks of objects selected in step 220. In case of backup processing for a physical machine, according to an embodiment, an agent inside the processed physical machine can be leveraged to provide backup agent 120 with the processed disk's data. After backup engine 120 is attached to production storage 130 and disk (s) 140 containing the selected file system objects, the method proceeds to step 250.

In step 250, backup engine 120 fetches content of disk blocks containing FAT 150, and parses the contents of FAT 150 to determine the locations of data blocks of all file system objects selected for backup in step 220. After backup engine 120 parses FAT 150, the method proceeds to step 260.

In step 260, backup engine 120 makes a copy of FAT 150 data blocks into backup

FAT 160, and saves FAT 160 data blocks as part of reconstructed disk image 170. Step 260 includes optionally modifying backup FAT 160 data records to remove pointers to any file system objects not selected for backup in step 220, and saving data blocks representing FAT 160 to reconstructed disk image 170 after modification is completed.

In step 265, a disk block counter is examined and a determination is made as to whether the previously processed disk block was the last block of disk 140 (i.e., if the end of disk 140 has been reached). Step 265 is performed by comparing current block number to total number of blocks in the disk 140. If it is determined that the last block has not been processed, control is passed to step 270. If it determined that the last block has been processed, the processing of disk 140 completes and control is passed to step 290.

As shown in FIG. 2, steps 265-285 are repeated as a loop or cycle until each block of disk 140 has been sequentially processed. In accordance with an embodiment, the first time step 265 is performed, a number, N, of blocks in disk 140 is determined, and in steps 265-285 are repeated for N cycles sequentially to process all blocks of disk 140. When step 265 is subsequently repeated after the initial performance, the current block number (corresponding to the current cycle step) in disk 140 is compared to N to determine if the last block has been reached. During processing of the block in steps 270-280, the current block is looked up in FAT 150 or FAT 160 to see if it belongs to a file system object that needs to be processed. According to an embodiment, FAT 150 or 160 contents can be cached in memory (RAM) for better lookup performance.

In accordance with an embodiment of the invention, processing of a block corresponding to a selected file system object is performed by completing steps 270-285, which are described below.

In step 270, backup engine 120 looks up the current data block in FAT 150 or 160. In this step, the current block from step 265 is looked up in FAT 150 or 160 to obtain information on what file system object this block belongs to in disk 140. After the block is looked up, the method proceeds to step 275.

In step 275, determination is made as to whether the block contents looked up in step 270 form part of a file system object selected to be backed up in step 220. According to an embodiment, this step is performed by deciding if the block contents looked up in step 270 corresponds to a file selected for the backup by correlating the actual block location (address) to FAT 150 or FAT 160 records, and determining whether it belongs to a file selected to be backed up in step 220. In another embodiment, step 275 is performed by determining if the block contents do not correspond to a file system object selected to be excluded from the backup in step 220. If it is determined that the block contents correspond to a file system object selected for the backup, the method proceeds to step 278. If it is determined that the block contents do not correspond to a file system object selected to be backed up, the method proceeds to step 285.

In step 278, the block contents corresponding to the read block are retrieved from disk 140 within production storage 130. After the block contents are read from production storage 130, the method proceeds to step 280.

In step 280, the block contents retrieved in step 278 are saved to reconstructed disk image 170. The block contents are saved to the same position in reconstructed disk image 170 as the position of that content in disk or disk image 140 of production disk storage 130. By repeating steps 265-280, block contents for files that were selected to be processed in step 220 are fetched from disk 140 and saved to reconstructed disk image 170. After the block contents are saved to reconstructed disk image 170, control is passed back to step 265 so that the next block in the disk can be processed.

In step 285, backup engine 120 writes a zeroed block to backup data 175 if the block was determined in step 275 to not correspond to a file system object selected for processing. According to an embodiment, this step is performed by saving zeroed data block in reconstructed disk image 170 instead of saving block contents from disk image 140 that correspond to a file system object not selected to be backed up in step 220. Step 285 reduces the amount of time needed to process backup 175 by not fetching block contents from disk 140, which do not need to be processed. Instead, step 285 saves zeroed blocks to reconstructed disk image 170. In an embodiment, step 285 also writes zeroed blocks for file system objects which will not be restored from the backup, such as, but not limited to, temporary files, virtual memory files, and hibernation files. In this way, the method saves storage space used to subsequently store backup 175 in backup file storage 180 without sacrificing the usefulness of backup 175. After the zeroed data block has been written to reconstructed disk image 170, control is passed back to step 265 so that the next block in the disk can be processed. In one embodiment, such as when backup solution features built-in block level deduplication and/or compression, zeroed data block may not be actually written to backup data 175, and instead pointer to previously stored block is written.

In step 290, backup engine 120 is shut down and the process ends. Step 290 is performed after it has been determined in step 265 that the last block of disk 140 has been reached.

Example Selective Processing User Interface

FIG. 3 illustrates a graphical user interface (GUI), according to an embodiment of the present invention. The GUI depicted in FIG. 3 is described with reference to the embodiments of FIGS. 1 and 2. However, the GUI is not limited to those example embodiments. For example, the GUI may be the UI 115 within operator console 110 used to select object-selective backup parameters 125, as described in step 220 above with reference to FIG. 2.

Although in the exemplary embodiment depicted in FIG. 3 the GUI is shown as an interface running on a computer terminal, it is understood that the GUI can be readily adapted to execute on a display of other platforms such as mobile device platforms running various operating systems, or another display of a computing device. For example, in an embodiment of the invention, the GUI illustrated in FIG. 3 can be displayed on a mobile device having an input device and a display.

FIG. 3 illustrates an exemplary backup object selection interface 300, wherein one or more file system file system objects from production storage 130 of a physical or virtual machine to be backed up can be displayed and selected by a backup operator. As described below and illustrated in FIG. 3, backup object selection interface 300 can be used to select file system objects for either inclusion in or exclusion from backup data 175.

According to an embodiment, by clicking, using an input device (not shown), include button 306, a backup operator can browse a list of displayed file system objects from the selected machine's production storage 130. In an embodiment, a backup operator, using an input device (not shown), selects Add button 308 to select one or more of the displayed file system objects to be included in backup 175. For example, through moving a pointer or cursor within file system objects displayed in as result of clicking include button 306 and subsequently selecting Add button 308, a backup operator selects one or more file system objects to be processed from production storage 130 and included in reconstructed disk image 170. According to an embodiment of the present invention, a backup operator can select one or more file system objects (e.g., "d:\Share\Home Folders" in the exemplary embodiment of FIG. 3) by either typing in the object name(s) or browsing to the location of the file system object(s) within production storage 130. A backup operator can remove previously added file system objects from a backup by clicking on Remove button 310.

One or more file system objects can be selected for inclusion in backup 175 by clicking on the file system objects displayed within backup object selection interface 300 and clicking Add button 308. Once the backup operator has finished selecting file system objects, backup parameters are saved by clicking on OK button 312. According to an embodiment, once the backup operator clicks OK button 312, backup parameters 125 are saved as VM processing settings to be used by backup engine 120. The current file system object selections can be canceled by clicking on Cancel button 314.

In an embodiment, file system objects to be excluded from backup 175 can be selected by clicking on exclude button 304. By clicking, using an input device (not shown), include button 306, a backup operator can browse a list of displayed file system objects from the selected machine's production storage 130. Add button 308 allows a backup operator to add one or more file system objects or environment variables (e.g., "c:\pagefile.sys,", "c:\hyberfil.sys," and "%TEMP%" in the exemplary embodiment of FIG. 3) to a list of file system objects to be excluded from backup 175. In an embodiment, a backup operator, using an input device (not shown), selects Add button 308 to select one or more of the displayed file system objects to be excluded from backup 175. For example, through moving a pointer or cursor within file system objects displayed in as result of clicking exclude button 304 and subsequently selecting Add button 308, a backup operator selects one or more file system objects that will not be read from production storage 130 and to be excluded from reconstructed disk image 170. A backup operator can remove previously added file system objects from the backup exclusion list by clicking on Remove button 310.

According to an embodiment, disable button 302 can be selected if the backup operator does not wish to select individual file system objects to be included in or excluded from backup 175.

As described above with reference to FIGS. 1 and 2, an object-selective image level backup is subsequently performed based upon backup parameters 125 selected and saved in backup object selection interface 300. In an embodiment, the display may be a computer display 430 shown in FIG. 4, and backup object selection interface 300 may be display interface 402. According to embodiments of the present invention, the input device can be, but is not limited to, for example, a touch screen, a keyboard, a pointing device, a track ball, a touch pad, a joy stick, a voice activated control system, or other input devices used to provide interaction between a backup operator and backup object selection interface 300.

Example Computer System Implementation

Figure 4:
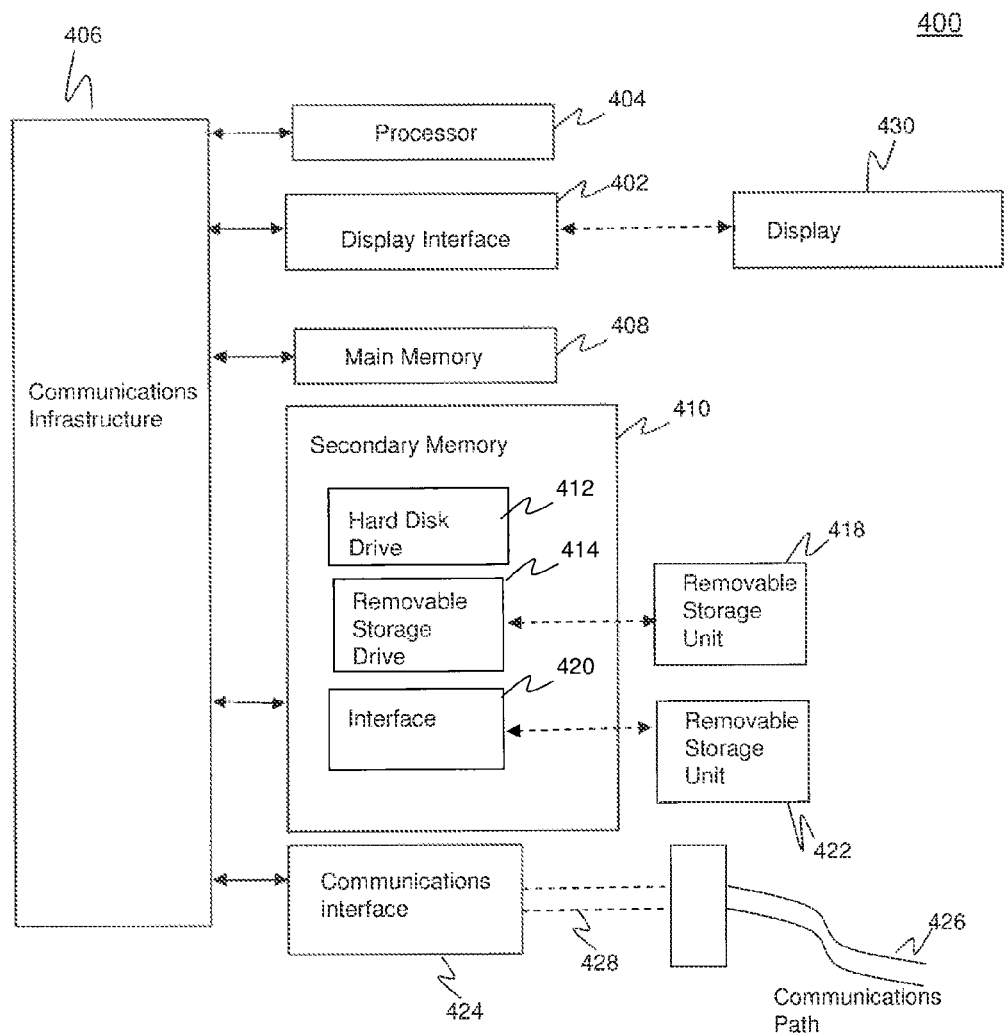
FIG. 4 depicts an example computer system in which an embodiment of the present invention may be implemented.

Various aspects of the present invention can be implemented by software, firmware, hardware, or a combination thereof. FIG. 4 illustrates an example computer system 400 in which the present invention, or portions thereof, can be implemented as computer-readable code. For example, the methods illustrated by the flowchart 200 of FIG. 2 can be implemented in system 400. Object-selective backup processing architecture 100 of FIG. 1 can also be implemented in system 400. Various embodiments of the invention are described in terms of this example computer system 400. After reading this description, it will become apparent to a person skilled in the relevant art how to implement the invention using other computer systems and/or computer architectures.

Computer system 400 includes one or more processors, such as processor 404. Processor 404 can be a special purpose or a general-purpose processor. Processor 404 is connected to a communication infrastructure 406 (for example, a bus, or network).

Computer system 400 also includes a main memory 408, preferably random access memory (RAM), and may also include a secondary memory 410. Secondary memory 410 may include, for example, a hard disk drive 412, a removable storage drive 414, flash memory, a memory stick, and/or any similar non-volatile storage mechanism. Removable storage drive 414 may comprise a floppy disk drive, a magnetic tape drive, an optical disk drive, a flash memory, or the like. The removable storage drive 414 reads from and/or writes to a removable storage unit 418 in a well-known manner. Removable storage unit 418 may comprise a floppy disk, magnetic tape, optical disk, etc. which is read by and written to by removable storage drive 414. As will be appreciated by persons skilled in the relevant art(s), removable storage unit 418 includes a non-transitory computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like.

Computer system 400 may additionally include computer display 430. According to an embodiment, computer display 430, in conjunction with display interface 402, can be used to display UI 115 on operator console 110. Computer display 430 may also be used to display backup object selection interface 300 depicted in FIG. 3.

In this document, the terms "computer program medium," "non-transitory computer readable medium," and "computer usable medium" are used to generally refer to media such as removable storage unit 418, removable storage unit 422, and a hard disk installed in hard disk drive 412. Computer program medium, computer readable storage medium, and computer usable medium can also refer to memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the present invention as discussed herein. In particular, the computer programs, when executed, enable processor 404 to implement the processes of the present invention, such as the steps in the methods illustrated by flowchart 200 of FIG. 2 and system architecture 100 of FIG. 1 discussed above. Accordingly, such computer programs represent controllers of the computer system 400. Where the invention is implemented using software, the software may be stored in a computer program product and loaded into computer system 400 using removable storage drive 414, interface 420, hard drive 412, or communications interface 424.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A system for selective processing of file system objects for an image level backup, comprising:
   a backup engine including:
      a receiving module configured to receive backup parameters for the image level backup, wherein the backup parameters include a selection of a machine to backup, and a selection of at least one file system object to include in the image level backup, wherein the selection of the at least one file system object is a directory name, a file name or a file mask;
      a connection module configured to attach to a source disk corresponding to the selected at least one file system object;
      a file allocation table (FAT) processing module configured to:
         fetch a FAT for the source disk;
         search the fetched FAT to determine a selected set of data blocks of the source disk such that the fetched FAT indicates that the selected set of data blocks correspond to the selected at least one file system object; and
         before completing the image level backup, create a backup FAT from the fetched FAT, wherein the backup FAT is different from the fetched FAT such that the backup FAT comprises only records corresponding to the selected at least one file system object; and
      a block processing module configured to:
         read the determined selected set of data blocks from the source disk, wherein the source disk includes at least one file system object not selected to include in the image level backup; and
         save the backup FAT and the determined selected set of data blocks to a reconstructed disk image.

2. The system of claim 1, wherein the backup parameters include a selection of at least one file system object to exclude from the image level backup, and wherein the FAT processing module is further configured to determine one or more data blocks corresponding to the excluded at least one file system object.

3. The system of claim 2, wherein the block processing module is further configured to skip processing of the data blocks corresponding to the excluded at least one file system object.

4. The system of claim 2, wherein the block processing module is further configured to write zeroed out data blocks to the reconstructed disk image instead of the data blocks corresponding to the excluded at least one file system object.

5. The system of claim 1, wherein the block processing module is further configured to exclude file system objects from the image level backup which have been marked for deletion.

6. The system of claim 1, further comprising a storage module configured to save the reconstructed disk image as the image level backup in a backup file storage.

7. The system of claim 6, wherein the storage module is further configured to:
perform content translation of blocks of the reconstructed disk image; and
save the content translated blocks of the reconstructed disk image as the image level backup.

8. The system of claim 1, wherein the connection module is further configured to attach to the source disk directly in the selected machine.

9. The system of claim 1, wherein the connection module is further configured to attach to the source disk through an agent in the selected machine.

10. The system of claim 1, wherein the receiving module is further configured to programmatically determine, based upon a selection of one or more file system objects to exclude from the image level backup, the selection of the at least one file system object to include in the image level backup.

11. A method for object-selective processing of file system objects for an image level backup, comprising:
receiving backup parameters for an image level backup, wherein the backup parameters include a selection of a machine to backup and a selection of at least one file system object to include in the image level backup, wherein the selection of the at least one file system object is a directory name, a file name or a file mask;
attaching to a source disk corresponding to the selected at least one file system object;
fetching a file allocation table (FAT) for the source disk;
searching the fetched FAT to determine a selected set of data blocks of the source disk such that the fetched FAT indicates that the selected set of data blocks correspond to the selected at least one file system object;
before completing the image level backup, creating a backup FAT from the fetched FAT, wherein the backup FAT is different from the fetched FAT such that the backup FAT comprises only records corresponding to the selected at least one file system object;
reading the determined selected set of data blocks from the source disk, wherein the source disk includes at least one file system object not selected to include in the image level backup; and
saving the backup FAT and the determined selected set of data blocks to a reconstructed disk image.

12. The method of claim 11, further comprising saving the reconstructed disk image as the image level backup in a backup file storage.

13. The method of claim 11, further comprising replicating the reconstructed disk image to a replica machine.

14. The method of claim 11, further comprising copying the reconstructed disk image to a remote backup file storage device or appliance.

15. The method of claim 11, further comprising programmatically determining, based upon a selection of one or more file system objects to exclude from the image level backup, the selection of the at least one file system object to include in the image level backup.

16. A non-transitory computer-readable medium having instructions stored thereon for selective processing of file system objects for an image level backup, the instructions comprising:
instructions for receiving backup parameters for an image level backup, wherein the backup parameters include a selection of a machine to backup and a selection of at least one file system object to include in the image level backup, wherein the selection of the at least one file system object is a directory name, a file name or a file mask;
instructions for attaching to a source disk corresponding to the selected at least one file system object;
instructions for fetching a file allocation table (FAT) for the source disk;
instructions for searching the fetched FAT to determine a selected set of data blocks of the source disk such that the fetched FAT indicates that the selected set of data blocks correspond to the selected at least one file system object;
instructions for creating a backup FAT from the fetched FAT before completing the image level backup, wherein the backup FAT is different from the fetched FAT such that the backup FAT comprises only records corresponding to the selected at least one file system object;
instructions for reading the determined selected set of data blocks from the source disk, wherein the source disk includes at least one file system object not selected to include in the image level backup; and
instructions for saving the backup FAT and the determined selected set of data blocks to a reconstructed virtual disk image.

17. The non-transitory computer-readable medium of claim 16, further comprising instructions to exclude file system objects from the image level backup which have been marked for deletion.

18. The non-transitory computer-readable medium of claim 17, further comprising instructions to exclude data blocks from the image level backup which correspond to deleted data.

19. The non-transitory computer-readable medium of claim 16, further comprising:
instructions to save the reconstructed disk image as the image level backup on a backup storage; and
instructions to compress the image level backup.

20. The non-transitory computer-readable medium of claim 16, wherein the instructions for receiving backup parameters comprise:
instructions to receive the backup parameters from a user interface; and
instructions to save the received backup parameters as machine processing settings.

21. The non-transitory computer-readable medium of claim 16, wherein the backup parameters include a selection of at least one file system object to exclude from the image level backup, and wherein the instructions further comprise: instructions to determine one or more data blocks corresponding to the excluded at least one file system object.

22. The non-transitory computer-readable medium of claim 16, further comprising instructions for programmatically determining, based upon a selection of one or more file system objects to exclude from the image level backup, the selection of the at least one file system object to include in the image level backup.

23. The system of claim 1, wherein the FAT processing module is configured to create the backup FAT from the fetched FAT by:
  before completing the image level backup;
  making a copy of the fetched FAT into the backup FAT; and
  modifying the backup FAT to remove pointers to file system objects not included in the backup parameters.

* * * * *